United States Patent
Metselaar (12) 
(10) Patent No.: US 9,016,593 B2
(45) Date of Patent: Apr. 28, 2015

(54) HVAC CONTROLLER WITH DYNAMIC TEMPERATURE COMPENSATION

(75) Inventor: John Metselaar, Paris (CA)

(73) Assignee: ecobee, inc., Toronto (CA)

( * ) Notice: Subject to any disclaimer, the term of this patent is extended or adjusted under 35 U.S.C. 154(b) by 804 days.

(21) Appl. No.: 13/179,912

(22) Filed: Jul. 11, 2011

(65) Prior Publication Data

US 2013/0018513 A1  Jan. 17, 2013

(51) Int. Cl.
*G05D 23/19* (2006.01)
*F24F 11/00* (2006.01)

(52) U.S. Cl.
CPC ........ *G05D 23/1902* (2013.01); *F24F 11/0012* (2013.01); *F24F 2011/0058* (2013.01); *F24F 2011/0072* (2013.01); *F24F 2011/0073* (2013.01)

(58) Field of Classification Search
CPC ................ F24F 11/0009; F24F 11/001; F24F 2011/0047
USPC ................ 62/126, 132; 236/1 C, 94
See application file for complete search history.

(56) References Cited

U.S. PATENT DOCUMENTS

| | | | |
|---|---|---|---|
| 4,300,199 A | 11/1981 | Yoknis et al. | |
| RE33,600 E | 6/1991 | Timmons | |
| 5,082,173 A | 1/1992 | Poehlman et al. | |
| 5,170,935 A | 12/1992 | Federspiel et al. | |
| 5,199,637 A * | 4/1993 | Adams | 236/78 R |
| 5,351,855 A | 10/1994 | Nelson et al. | |
| 5,651,498 A | 7/1997 | Meyer et al. | |
| 7,364,353 B2 * | 4/2008 | Kolk | 374/1 |
| 7,784,705 B2 * | 8/2010 | Kasper et al. | 236/44 C |
| 7,836,712 B2 | 11/2010 | Sasao et al. | |
| 7,908,117 B2 | 3/2011 | Steinberg et al. | |
| 8,463,444 B2 | 6/2013 | George | |
| 2005/0235660 A1 * | 10/2005 | Pham | 62/126 |
| 2009/0099699 A1 | 4/2009 | Steinberg et al. | |
| 2011/0051823 A1 * | 3/2011 | Imes et al. | 375/259 |

* cited by examiner

*Primary Examiner* — Jonathan Bradford
(74) *Attorney, Agent, or Firm* — Perry + Currier Inc.

(57) ABSTRACT

A controller is provided for operating HVAC equipment using an environmental control program. The controller has an environmental sensor operable to provide a measured temperature value to the environmental control program. The controller further runs a dynamic temperature control program that is operable to provide a dynamic correction factor to the environmental control program that dynamically compensates the measured temperature value for waste heat generated by power consumption within the controller.

20 Claims, 9 Drawing Sheets

HVAC CONTROLLER WITH DYNAMIC TEMPERATURE COMPENSATION

FIELD OF USE

The present invention relates to HVAC equipment. More specifically, the present invention relates to measuring temperature within the HVAC controller.

SUMMARY

According to an embodiment of the invention, there is provided a controller for operating HVAC equipment on a premise, the controller having:
- a processor operable to run an environmental control program, the environmental control program being operable to control the HVAC equipment;
- volatile and non-volatile memory; and
- an environmental sensor operable to provide a measured temperature value to the environmental control program; and
- wherein the processor is further operable to run a dynamic temperature control program that is operable to provide a dynamic correction factor to the environmental control program that dynamically compensates the measured temperature value for waste heat generated by power consumption within the controller.

According to another embodiment of the invention, there is provided a method for measuring temperature in a controller on a premise, the controller having an internal environmental sensor, the method comprising:
- receiving a measured temperature value from the environmental sensor;
- applying a dynamic correction factor to the measured temperature value to determine a corrected ambient temperature value which compensates for waste heat within the controller; and
- providing the corrected ambient temperature value to an environmental control program running on the controller, the environmental control program being operable to control HVAC equipment on the premise; and
- wherein the dynamic correction factor is determined by calculating a power consumption value within the controller.

According to another embodiment of the invention, there is provided a dynamic control program for compensating for waste heat measured in a controller, the dynamic control program being operable to run on a processor of the controller located on a premise, the controller having an internal environmental sensor, comprising:
- the program receiving a measured temperature value from the environmental sensor;
- the program applying a dynamic correction factor to the measured temperature value to determine a corrected ambient temperature value which compensates for waste heat within the controller; and
- the program providing the corrected ambient temperature value to an environmental control program running on the controller, the environmental control program being operable to control HVAC equipment on the premise; and
- wherein the dynamic correction factor is determined by calculating a power consumption value within the controller.

BRIEF DESCRIPTION OF THE DRAWINGS

Embodiments will now be described by way of example only, with reference to the following drawings in which.

DETAILED DESCRIPTION

Figure 1:
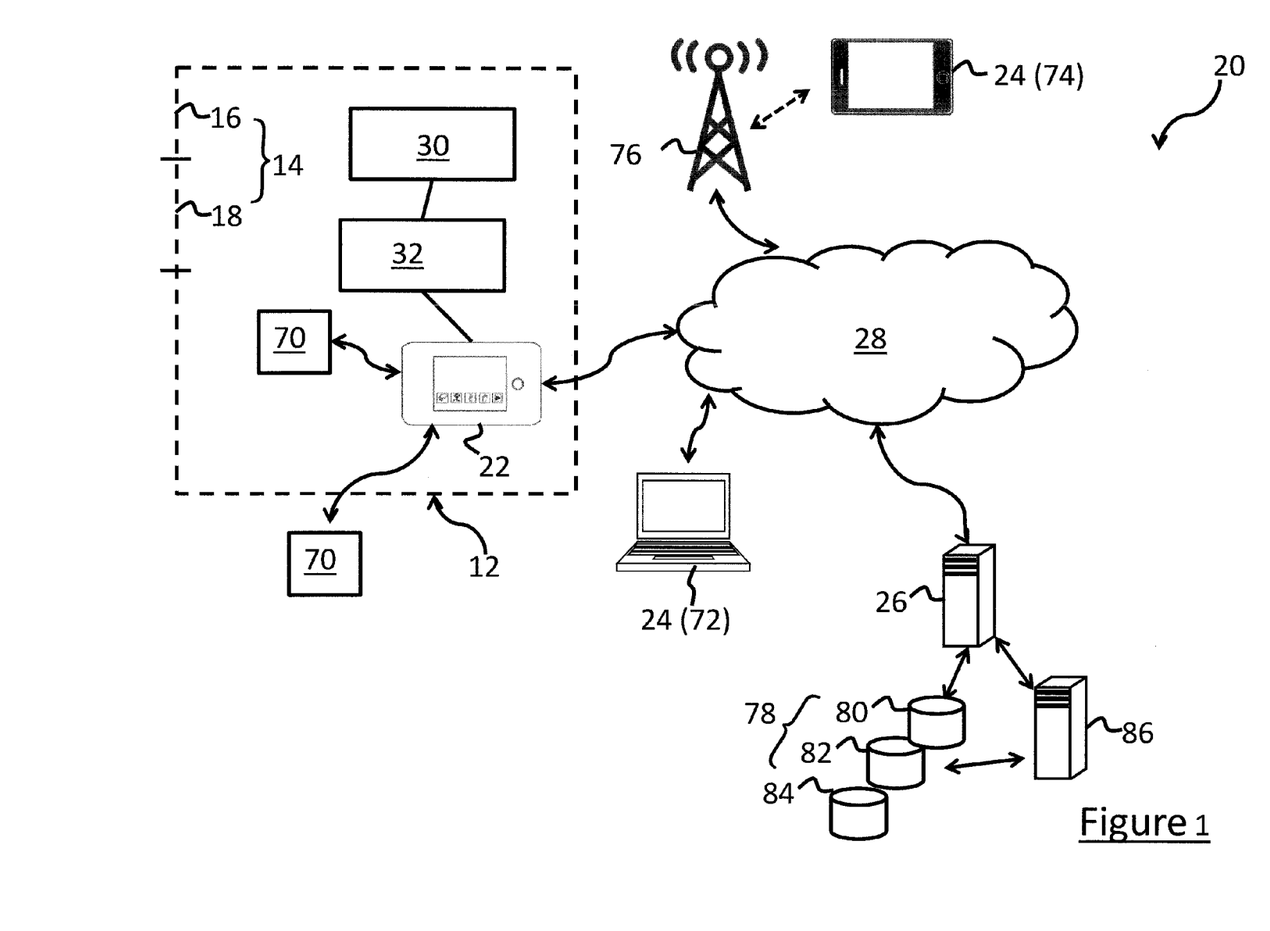
FIG. 1 is a schematic illustrating an embodiment of an integrated climate control system (ICCS) comprising an environmental web server, a controller for HVAC equipment and one or more remote devices, all communicatively coupled via a network.

Referring now to FIG. 1, a premise 12 is shown generally at 12. Premise 12 is typically a personal home or residence, an enterprise or other building. Premise 12 includes an external perimeter 14 that may have regions of different insulating characteristics. For example, external perimeter 14 can include walls 16, and window panes 18, each of which have different R-values. In fact, different window panes 18 can have differing R-values from each other, depending on the age and materials used for the windows. In addition, there is a certain amount of airflow exchange between the outside and the inside of external perimeter 14, caused by cracks, chimneys, exhaust vents, opening windows and doors, etc.

Climate control for premise 12 is provided by an integrated climate control system (ICCS) 20. ICCS 20 includes a controller 22 located within the premise. In addition, ICCS 20 can include at least one remote device 24, and an environmental web service 26, which are both in periodic communication with controller 22 via a network 28. Network 28 can include different, interconnected networks such as a private network (often a private Wi-Fi network) in communication with the public Internet.

Controller 22 is adapted to control HVAC equipment 30, which is typically also located within premise 12. Controller 22 is often colloquially referred to as a 'smart thermostat', but of course may also regulate HVAC functions other than temperature. HVAC equipment 30 can include furnaces, air conditioning systems, fans, heat pumps, humidification/dehumidification systems and the like. Controller 22 can be connected to HVAC equipment 30 using a hard-line connection (such as a 4-wire connector), a wireless connection, or a combination of the two. In some configurations, an equipment interface module (EIM) 32 can be provided as an interface between the controller 22 and HVAC equipment 30. The EIM 32 receives commands from the controller 22 across the hard-line or wireless connection, and then activates or deactivates the relays required to control the HVAC equipment 30. In addition, the EIM 32 includes detectors operable to monitor the operational status of HVAC equipment and transmit error codes and conditions back to controller 22.

Figure 2:
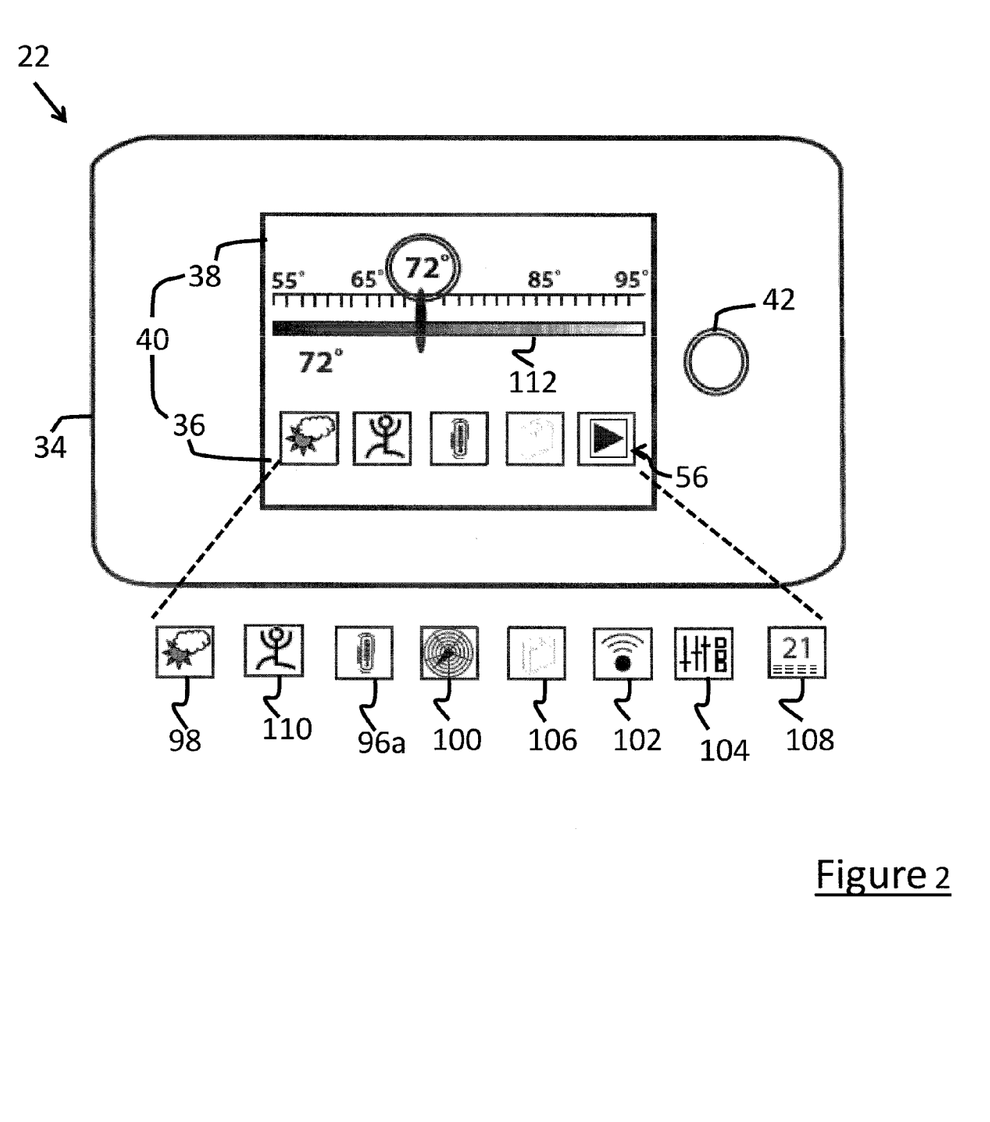
FIG. 2 is a front plan view of the controller shown in FIG. 1, and illustrates some of the external features, screen display and programs executable on the controller.

Referring now to FIG. 2, controller 22 is described in greater detail. Controller 22 includes a housing 34, which in the presently-illustrated embodiment, includes vents to allow airflow within the housing. Controller 22 also includes at least one input 36 adapted to receive user commands and an output 38 that is adapted for displaying environmental, operational, historical and programming information related to the operation of HVAC equipment 30. Input 36 can include fixed-function hard keys, programmable soft-keys, or programmable touch-screen keys, or any combination thereof. Output 38 can include any sort of display such as a LED or LCD screen, including segmented screens. In the currently-illustrated embodiment, the output 38 is a colour LCD screen having varying levels of brightness. Of course, input 36 and output 38 can be combined as a touch-screen display 40. The sensing technologies used by touch-screen display 40 may include capacitive sensing, resistive sensing, surface acoustic wave sensing, pressure sensing, optical sensing, and the like. In the presently-illustrated embodiment, controller 22 includes a 3.5" TFT touch screen display 40 using resistive sensing, which provides the functionality for both input 36 and output 38. In addition, controller 22 includes a hard key 42 (i.e., the "home" button) as an additional input 36 option.

Figure 3:
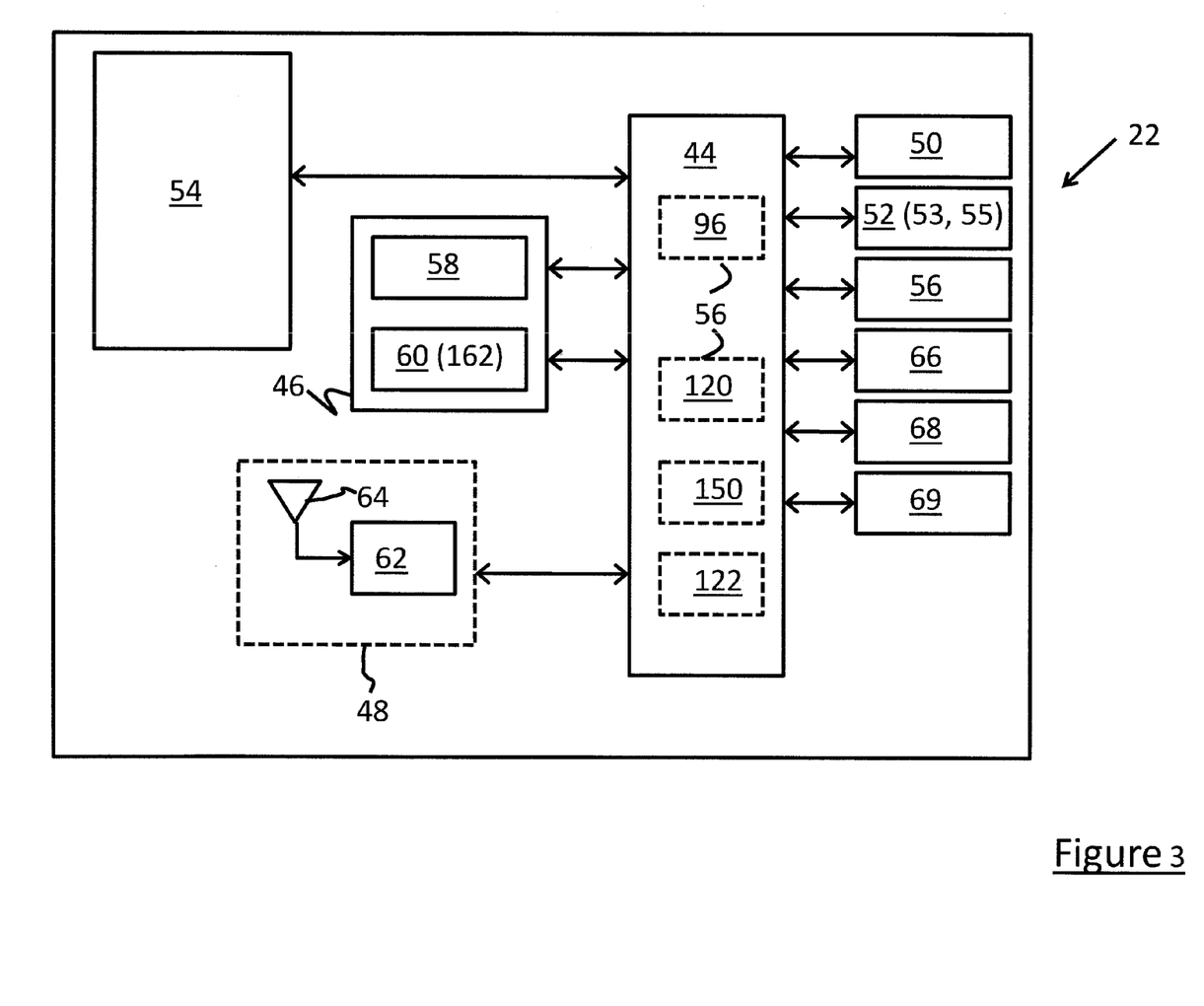
FIG. 3 is a schematic illustrating an electronic architecture of the controller shown in FIG. 1.

Referring now to FIG. 3, the internal components of controller 22 are shown in greater detail. In the presently-illustrated embodiment, controller 22 includes a processor 44, memory 46, a radio frequency (RF) subsystem 48, I/O interface 50, power source 52 and environmental sensor(s) 54.

Processor 44 is adapted to run various applications 56, many of which are displayed on touch screen display 40 (FIG. 2) on controller 22. Details on applications 56 are provided in greater detail below. In presently-illustrated embodiment, processor 44 is a system on a chip (SOC) running on an ARM processor. Processor 44 can include additional integrated functionality such as integrating a touch-screen controller or other controller functions. Those of skill in the art will recognize that other processor types can be used for processor 44. Memory 46 includes both volatile memory storage 58 and non-volatile memory storage 60 and is used by processor 44 to run environmental programming (such as applications 56), communications and store operation and configuration data. In the presently-illustrated embodiment, the volatile memory storage 58 uses SDRAM and the non-volatile memory storage 60 uses flash memory. Stored data can include programming information for controller 22 as well as historical usage data, as will be described in greater detail below. Other types of memory 46 and other uses for memory 46 will occur to those of skill in the art.

RF subsystem 48 includes a Wi-Fi chip 62 operably connected to a Wi-Fi antenna 64. In the presently-illustrated embodiment, Wi-Fi chip 62 support 802.11b/g communication to a router within range that is connected to network 28. As currently-illustrated, Wi-Fi chip 62 supports encryption services such as WPA, WPA2 and WEP. Other networking protocols such as 802.11a or n, and 802.16 (WiLan), as well as other encryption protocols are within the scope of the invention. RF subsystem 48 can further include other wireless communication subsystems and controllers, such as cellular communication subsystems, Bluetooth subsystems, Zigbee subsystems or IR subsystems.

I/O interface 50 provides the physical connectors for controller 22. For example, I/O interface 50 may include the connectors for a 4-wire connection to HVAC equipment 30 (FIG. 1). I/O interface can also include a debug port, a serial port, DB9 pin connector, a USB or microUSB port, or other suitable connections that will occur to those of skill in the art. Power source 52 provides electrical power for the operation of controller 22 and can include both wire-line power supplies and battery power supplies. In the presently-illustrated embodiment, the four-wire connection to I/O ports 50 can also provide the necessary power for controller 22, as well as any necessary surge protection or current limiters. Power source 52 can also include a battery-based back-up power system. In addition, power source 52 may provide a power connection jack which allows the controller 22 to be powered on without being connected to the 4 wire connection, or relying upon battery backup. In the presently-illustrated embodiment, power source 52 further includes a current sensor 53 that is operable to measure the current draw of power source 52. Also in the presently-illustrated embodiment, power source 52 includes a voltage sensor 55 that is operable to measure the voltage at power source 52.

In addition, controller 22 can include one or more expansion slots or sockets 66. The expansion slot/socket 66 is adaptable to receive additional hardware modules to expand the capabilities of controller 22. Examples of additional hardware modules include memory expansion modules, remote sensor modules, home automation modules, smart meter modules, etc. The expansion slot/socket 66 could include an additional RF component such as a Zigbee® or Zwave™ module. The home automation module would allow capabilities such as remote control of floor diffusers, window blinds, etc. The combination of remote sensing and remote control would serve as an application for Zoning temperature Zone control.

Environmental sensor(s) 54 is adapted to provide temperature and humidity measurements to the processor 44. In the presently-illustrated embodiment, environmental sensor 54 is an integrated component, but could also be separate thermistors and hydrometers. It is contemplated that environmental sensor 54 could include additional sensing capabilities such as carbon-monoxide, air pressure, smoke detectors or air flow sensors. Other sensing capabilities for environmental sensor 54 will occur to those of skill in the art. The environmental sensor 54 may be built near vents located near the "bottom" of housing 34 (relative to when controller 22 is mounted on a wall) so as to minimize the effects of waste heat generated by the hardware of controller 22 upon environmental sensor 54.

Controller 22 can include additional features, such as an audio subsystem 68. The audio subsystem 68 can be used to generate audible alerts and input feedback. Depending on the desired features, audio subsystem 68 can be adapted to synthesize sounds or to play pre-recorded audio files stored in memory 46.

Another additional feature for controller 22 is a mechanical reset switch 69. In the presently-illustrated embodiment, mechanical reset switch 69 is a microswitch that when depressed either restarts the controller 22 or reinitializes the controller 22 back to its original factory condition.

Controller 22 may be operable to communicate with one or more remote sensors 70 that are distributed around the inside and/or the outside of premise 12. Remote sensors 70 are operable to provide remote sensor data for temperature, humidity, air flow and/or $CO_2$. Within premise 12, multiple remote sensors $70_{inside}$ are typically used to provide zone control. A remote sensor $70_{outside}$ located outside the premise is used to provide weather information. In particular, remote sensor $70_{outside}$ can provide local outdoor temperature, humidity, air pressure and/or air flow measurements.

Figure 4:
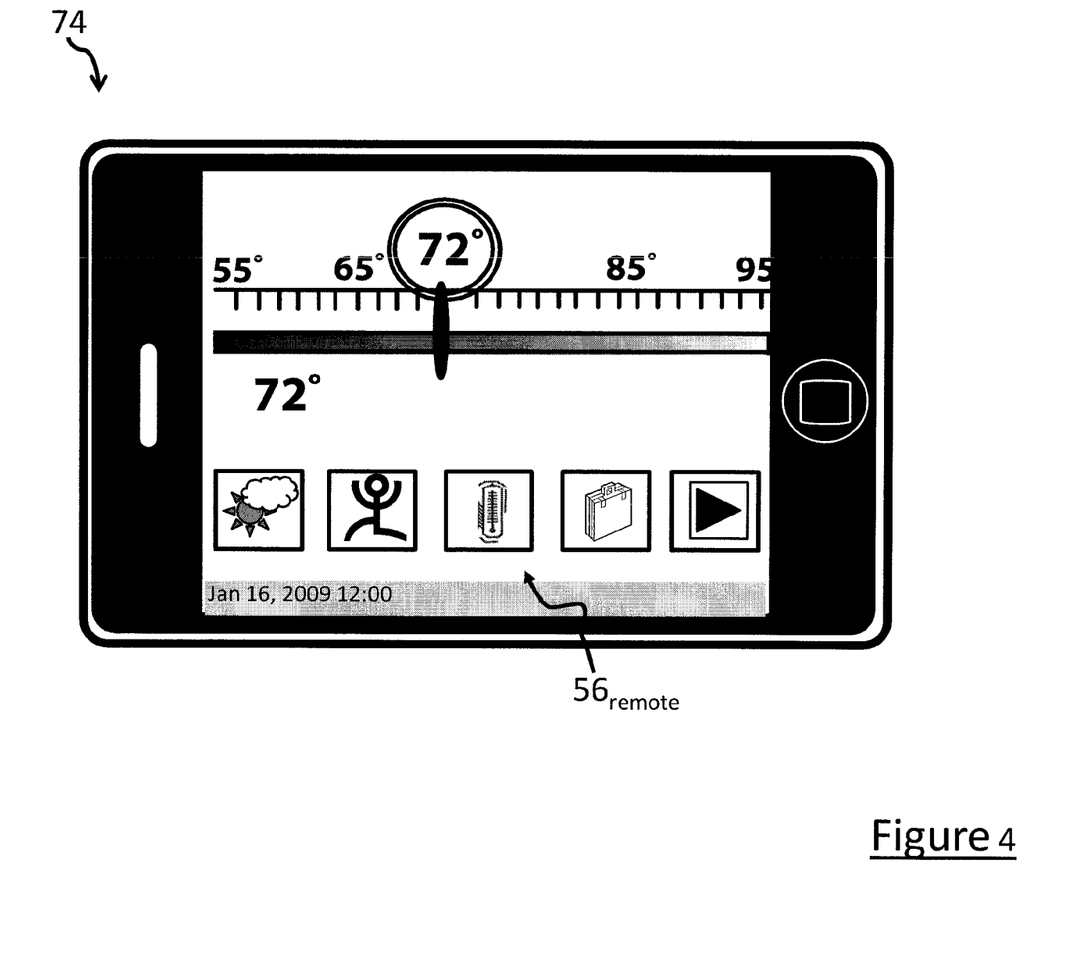
FIG. 4 is a front plan view of one of the remote devices shown in FIG. 1, the remote device having a replica screen of the screen display of the environmental control device illustrated in FIG. 2.

Referring back to FIG. 1, other components of ICCS 20 are described in greater detail. The remote device 24 is adapted to be located remote from the controller 22 and can include either or both of: a personal computer 72 (including both laptops and desktop computers), and a mobile device 74 such as a smart phone, tablet or Personal Digital Assistant (PDA). The remote device 24 and more typically the mobile device 74 may be able to connect to the network 28 over a cellular network 76. As can be seen in FIG. 4, remote device 24 includes one or more remote applications $56_{remote}$. As will be described in greater detail below, the remote applications $56_{remote}$ are akin to the applications 56 found on controller 22, and generally provide similar functionality. However, remote applications $56_{remote}$ may be reformatted to account for the particular display and input characteristics found on that particular remote device 24. For example, a mobile device 74 may have a smaller touch screen than is found on controller 22. It is also contemplated that remote applications $56_{remote}$ may have greater or reduced functionality in comparison to their counterparts, applications 56.

The remote device 24, and most typically the personal computer 72 may connect to network 28 using either a wireline connection or a wireless connection, for example. The personal computer 72 can be loaded with an appropriate browsing application for accessing and browsing the environmental web service 26 via network 28. Personal computer 72 is operable to run one or more PC applications $56_{PC}$ (not illustrated), which can include web-based applications. As will be described in greater detail below, the PC applications $56_{PC}$ are akin to the applications 56 found on controller 22, and generally provide similar functionality. However, PC applications $56_{PC}$ are reformatted to account for the particular display and input characteristics found on personal computer 72. For example, a personal computer 72 may have a larger screen, and a mouse or touchpad input. It is also contemplated that PC applications $56_{PC}$ may have greater or reduced functionality in comparison to their counterparts, applications 56.

The environmental web service 26 may be owned by a separate organization or enterprise and provides web portal application for registered users (typically the owners of controllers 22). Environmental web service 26 acts as a web server and is able to determine and deliver relevant content to controllers 22 and to remote devices 24 (i.e., personal computers 62 and mobile devices 64). For example, environmental web service 26 may deliver applications 56, $56_{remote}$ and $56_{PC}$ to any accessing device using the appropriate internet protocols. In effect, environmental web service 26 allows the controller 22 to communicate with remote devices 24. Environmental web service 26 may also transfer data between its own content databases, controllers 22 and remote devices 24. Environmental web service 26 is further operable to enable remote or web-based management of controller 22 from a client using the aforementioned remote device 24. Environmental web service 26 provides the set of web widgets and that provides the user interface for users of remote devices 24. It is further contemplated that environmental web service 26 is operable to provide remote software updates to the applications 56 over network 28.

Environmental web service 26 may further includes an energy modelling server 86 that is operable to query aggregate data warehouse 84 and customer account data 80 to provide energy modelling services for customers. Specifically, energy modelling server 86 is operable to run an energy model 88 which simulates the physics and enthalpy of premises 12 (i.e., buildings whose HVAC controls are regulated by a controller 22) by modelling energy usage based upon physical attributes 90, historical energy data 92 and usage attributes 94.

Controller 22, and in particular, in cooperation with the other components of ICCS 20, can provide climate control functionality beyond that of conventional thermostats through the running of applications 56 on controller 22 and/or the running of applications $56_{remote}$, $56_{PC}$, etc. on their respective remote devices 24. Referring back to FIGS. 2 and 3, some of applications 56 running on controller 22 will be briefly discussed. Applications 56 can include an environmental control program (ECP) 96, a weather program 98, an energy use program 100, a remote sensors program 102 and a Configuration program 104. Other programs will occur to those of skill in the art.

ECP 96 is operable to display and regulate environmental factors within a premise 12 such as temperature, humidity and fan control by transmitting control instructions to HVAC equipment 30. ECP 96 displays the measured current temperature and the current temperature set point on touch screen display 40. ECP 96 may also display the measured current humidity and/or humidity set point (not currently illustrated). Alternatively, ECP 96 may simply indicate when HVAC equipment 30 is actively providing humidification. ECP 96 may also include an ECP Details program 96a, which provides additional control over ECP 96. In addition, ECP 96 maintains historical record data of set points and measured values for temperature and humidity. These can be stored locally in memory 46, or transmitted across network 28 for storage by environmental web service 26 in aggregate data warehouse 84.

Figure 5:
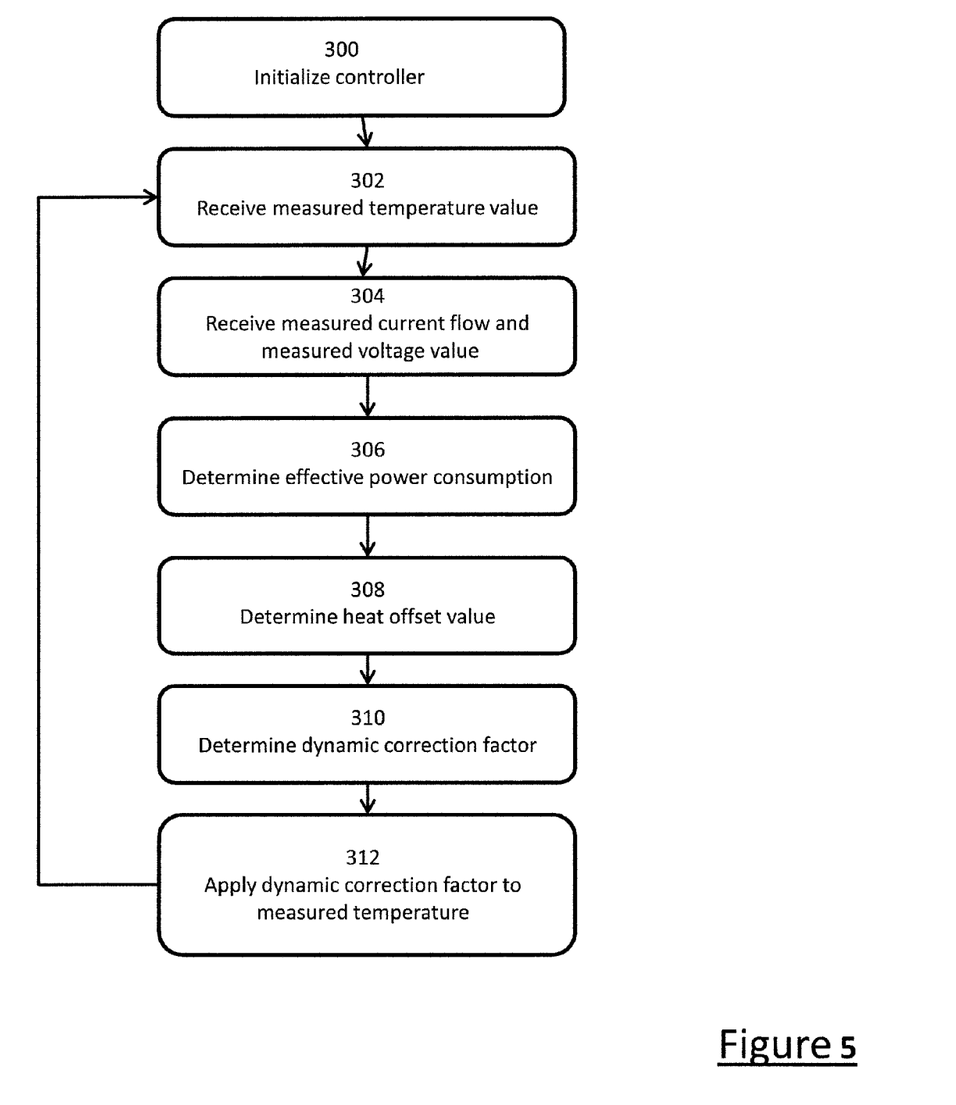
FIG. 5 is an illustration of a method for running a dynamic temperature compensation program (DTCP) on the controller shown in FIG. 1, the PSCP being operable to compensate for waste heat within a controller.

ECP 96 may be manipulated by a user in numerous ways including a scheduling program 106, a vacation override program 108, a quick save override program 110 and a manual temperature adjustment through the manipulation of a temperature slider 112. As shown in FIG. 5, the scheduling program 106 allows a user to customize the operation of HVAC equipment 30 according to a recurring weekly schedule. The weekly schedule allows the user to adjust set-points for different hours of the day that are typically organized into a number of different time periods 114 such as, but not limited to, "Awake", "Away", "Home" and "Sleep". Scheduling program 106 may include different programming modes such as an editor 116 and a wizard 118. Scheduling program 106 may also include direct manipulation of the weekly schedule through various touch gestures (including multi-touch gestures) on image of the schedule displayed on the touch screen display 40. Scheduling program 106 may also include provisions for time of use pricing and/or demand-response events (when optional for the user).

Weather program 98 is operable to provide a user with current and/or future weather conditions in their region. The icon for weather program 98 on the home screen of controller 22 indicates the current local external temperature and weather conditions. This information is provided from an external feed (provided via environmental web service 26), or alternatively, an outdoor remote temperature sensor 70 connected directly or indirectly to controller 22, or a combination of both an external feed and a remote temperature sensor. In the presently-illustrated embodiment, selecting the weather program 98 replaces the current information on touch screen display 40 with a long-term forecast (i.e., a 7 day forecast) showing the predicted weather for later times and dates. The information for the long term forecast is provided via environmental web service 26.

Energy use program 100 is a program that allows users to monitor and regulate their energy consumption (i.e., electricity use or fossil fuel use). Energy use program 100 can include a real-time display of energy use, regular reports (hourly, daily, weekly, etc.), and provide estimates of projected costs. Energy use program 100 may also allow a user to configure how their HVAC equipment 30 responds to different Demand-Response events issued by their utility. The energy use program 100 may require additional hardware components, such as a smart meter reader in expansion slot/socket 66, as well as smart plugs installed on the premise 12 (not shown). Without the necessary hardware components, the energy use program 100 may be either dimmed out or not present on the touch screen display 40.

Remote sensor program 102 allows users to configure and control remote sensors 70 that are distributed around the inside and/or outside of premise 12. When remote sensors 70 are not utilized, then the remote sensor program 102 may be either dimmed out or not present on the touch screen display 40.

Configuration program 104 (alternatively called "Settings") allows a user to configure many different aspects of their controller 22, including Wi-Fi settings, Reminders and Alerts, Installation Settings, display preferences, sound preferences, screen brightness, and Password Protection. Users may also be able to adjust their own privacy settings, as well as configure details pertaining to their HVAC equipment 30, such as the type and manufacture of the furnace, air conditioning and/or humidification system. In addition, users of Configuration program 104 may be able to specify certain physical and environmental parameters of their premise 12, such as the size of premise 12, or the number of inhabitants of premise 12. Additionally, a user may be able to specify the type of construction and materials used for window panes 16, such as single or double paned, argon filled, etc. Other aspects of controller 22 that can be modified using the configuration program 104 will occur to those of skill in the art.

Controller 22 may include additional applications 56 which operate as back-end applications (i.e., they operate without direct user interaction), such as a reporting application 120, which transmits runtime data to environmental web service 26. In the currently-illustrated embodiment, reporting application 120 periodically transmits data to web service 26 representing five-minute buckets of runtime data to be stored in aggregate data warehouse 84. Exemplary runtime data that can be sent includes time and date stamps, programmed mode, measured temperature and humidity (as measured by environmental sensor(s) 54), temperature set points, outdoor temperature, furnace usage (as either a percentage of use during the reporting window, by furnace stage or both), fan usage (as a percentage of the reporting window), wireless signal strength, etc. If a smart meter module is installed in the expansion slot/socket 66, the reporting application 120 can also transmit the metered energy usage and/or energy cost. Other data to be transmitted by reporting application 120 will occur to those of skill in the art. The reporting application 120 is not primarily visible on touch screen display 40, but may be configurable using the Configuration program 104. It is contemplated that either the runtime data transmitted by reporting application 120 and/or aggregate data reports of the runtime data could also be stored within non-volatile memory 60 on controller 22.

Another back-end program 56 run on controller 44 is a dynamic temperature correction program (DTCP) 150. DTCP 150 is operable to provide a corrected measured temperature value to ECP 96 that is corrected for the thermal delta between the ambient indoor temperature within premise 12, and the internal temperature within housing 34 (caused by waste heat). DTCP 150 is adapted to calculate a dynamic correction factor 152, which can be subsequently applied to the indoor temperature value as measured by environmental sensor 54, by ECP 96. The dynamic correction factor 152 allows for ECP 96 to correct for the waste heat generated by the various hardware located within controller 22, such as the processor 44, RF subsystem 48 and touch screen display 40. Referring now to FIG. 5, a method illustrating one embodiment of DTCP 150 is provided.

Beginning at step 300, controller 22 is powered on and initialized. Controller 22 loads its various programs such as ECP 96 and DTCP 150 into volatile memory storage 58 to be run on processor 44. Once controller 22 is fully initialized, the method advances to step 302.

At step 302, DTCP 150 receives a measured temperature value 154 from environmental sensor 54, indicating the temperature within premise 12. (For ease of illustration, an external temperature sensor 70 is not being used). The method then advances to step 304.

At step 304, DTCP 150 receives a measured current flow value 156 from the current sensor 53 on power supply 52, the measured current flow value 156 indicating current flow (in milliamps) within controller 22. DTCP 150 further receives a measured voltage value 157 from the voltage sensor 55 on power supply 52. The measured current flow value 156 and measured voltage value 157 are used to calculate an instantaneous power consumption value 158 (instantaneous power consumption 158=measured current flow 156*measured voltage value 157), representing the instantaneous power consumption (in watts) of controller 22. The method then advances to step 306. Alternatively, a known (i.e., a predetermined, estimated or calculated) voltage at power supply 52 could also be used in lieu of a measured voltage.

At step 306, DTCP 150 applies exponential smoothing to the instantaneous power consumption value 158 to determine an effective power consumption value 160 (in kilowatt-hours) for the controller 22. The method then advances to step 308.

At step 308, DTCP 150 references the effective power consumption value 160 in a temperature offset table 162 stored in non-volatile storage 60 to return a heat offset value 164. Optionally, if controller 22 includes an airflow sensor, DTCP 150 may apply an airflow correction value 165 to modify the heat offset value 162. The method then advances to step 310.

At step 310, DTCP 150 uses the heat offset value 164 to determine the dynamic correction factor 152. In the currently-illustrated method, the heat offset value 164 is not fully applied as the dynamic correction factor 152 upon boot-up of controller 22. Instead, the heat offset value 164 is applied as the dynamic correction factor 152 as a function of time. The full amount of heat offset value 164 is gradually applied (i.e., phased in) over a period of time (e.g., 20-30 minutes) in order to reflect the increasing temperature within controller housing 24). The method then advances to step 312.

At step 312, DTCP 150 applies the dynamic correction factor 152 to the measured temperature value 154 (measured by environmental sensor 54) to return a corrected indoor temperature value 166. The corrected indoor temperature value 166 is subsequently displayed upon touch screen display 40 and used by ECP 96 in regulating the operation of HVAC equipment 30. It is also contemplated that the corrected indoor temperature value 166 can be used for other functions of ECP 96, as well as other applications 56 on controller 22. For example, environmental sensor 54 is adapted to provide humidity measurements for premise 12, and as presently illustrated, a relative humidity measurement.

The corrected indoor temperature value 166 is used by ECP 96 to provide a corrected relative humidity. Once step 312 is complete, the method then returns to step 302 and continues throughout the operation of controller 22.

Figure 6:
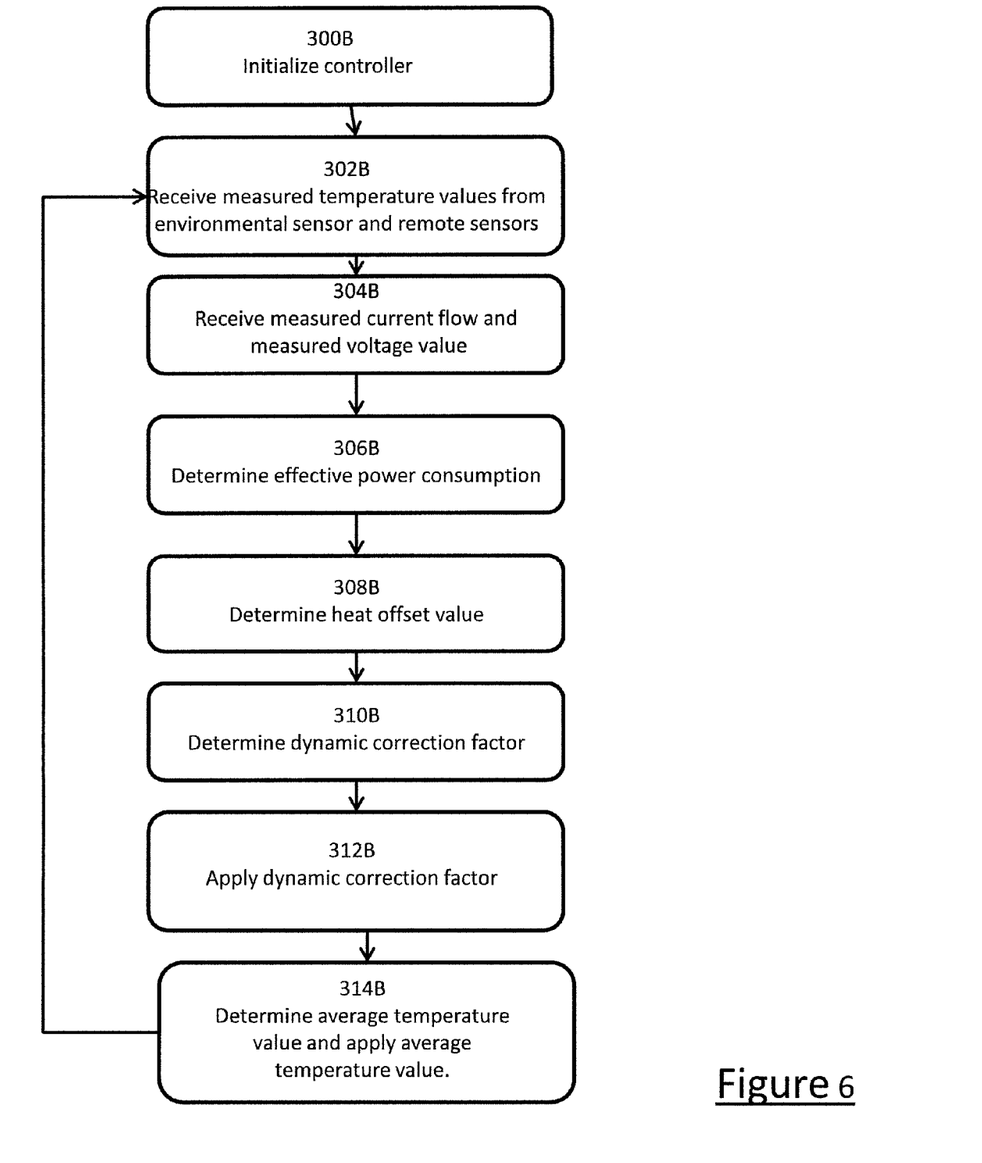
FIG. 6 is an illustration of another method for running a dynamic temperature compensation program (DTCP) on the controller shown in FIG. 1.

In the presently-illustrated embodiment, a dynamic correction factor is not generally used for temperature readings provided to controller 22 by remote sensors $70_{inside}$ as remote sensors $70_{inside}$ do not typically generate significant amounts of heat. However, if remote sensors where used that did generate significant amounts of heat, a similar dynamic correction factor could be applied. Referring now to FIG. 6, a method illustrating another embodiment of DTCP 150, namely DTCP 150B is provided, beginning at step 300B.

At step 300B, DTCP 150B operates similarly to that of DTCP 150 unless otherwise stated, but further incorporates the temperature readings from remote sensors $70_{inside}$. At step 302B, DTCPB receives a measured temperature value $154B_{ES}$ from environmental sensor 54 and at least one additional measured temperature value $154B_{RS}$ from remote sensors $70_{inside}$.

At step 312B, DTCP 150B applies the dynamic correction factor 152B to the measured temperature value $154B_{ES}$ to generate a corrected indoor temperature value $166B_{ES}$, but not to any measured temperature values $154B_{RS}$. The corrected indoor temperature value $166B_{ES}$ is not displayed upon touch screen display 40 or used by ECP 96. Instead, the method then advances to step 31413.

At step 314B, DTCP 150B averages the corrected indoor temperature value $166B_{ES}$ with the measured temperature values $154B_{RS}$ to yield an average indoor temperature value 168B. The corrected average indoor temperature value 168B is subsequently displayed upon touch screen display 40 and used by ECP 96 in regulating the operation of HVAC equipment 30. In the presently-illustrated embodiment, each measured temperature value 154B (from both environmental sensor 54 and each remote sensors 70) is weighted equally in determining average temperature value 168B. However, other weightings of measured temperature values 154 could also be used. For example, measured temperature values $154B_{RS}$ could be weighted more heavily than measured temperature values $154B_{ES}$ when controller 22 is first initialized, but subsequently weighted more evenly once controller 22 achieves a fairly stable internal temperature.

It is contemplated that a dynamic heating offset could be determined using alternative means to current sensing. For example, various activities within controller 22 could be assigned a power consumption value. For example, a power consumption value could be assigned to each level of brightness provided by touch screen display 40 (10 levels in the current embodiment). In another example, a power consumption value could be assigned for the RF subsystem 48 when it is not transmitting and a second power consumption value when the RF subsystem value is transmitting. All the assigned power consumptions values could be summed together to determine an effective power consumption value 160 which would be referenced in temperature offset table 162.

It is further contemplated that the heat offset values 164 in heat offset table 162 could be periodically updated with newer values. For example, environmental web service 26 could transmit newer values across network 28. Alternatively, DTCP 150 could compare the measured temperature values $154_{RS}$ from multiple remote sensors 70 against the corrected indoor temperature value $166_{ES}$ to see if modified heat offset values 164 would achieve more consistent and uniform results.

Controller 22 further includes a predictive set-point control program (PSCP) 122. PSCP 122 is adapted to receive external weather information (from either an external remote sensor or provided by environmental web service 26) and, using weather forecast data, current weather data and historical weather data, subsequently adjust the operating instructions sent to HVAC equipment 30 so as to better achieve the user-determined set points provided in ECP 96, and/or to avoid undesired side effects such as condensation. PSCP 122 can be adapted to adjust the temperature set point and/or the humidity set point.

Figure 7:
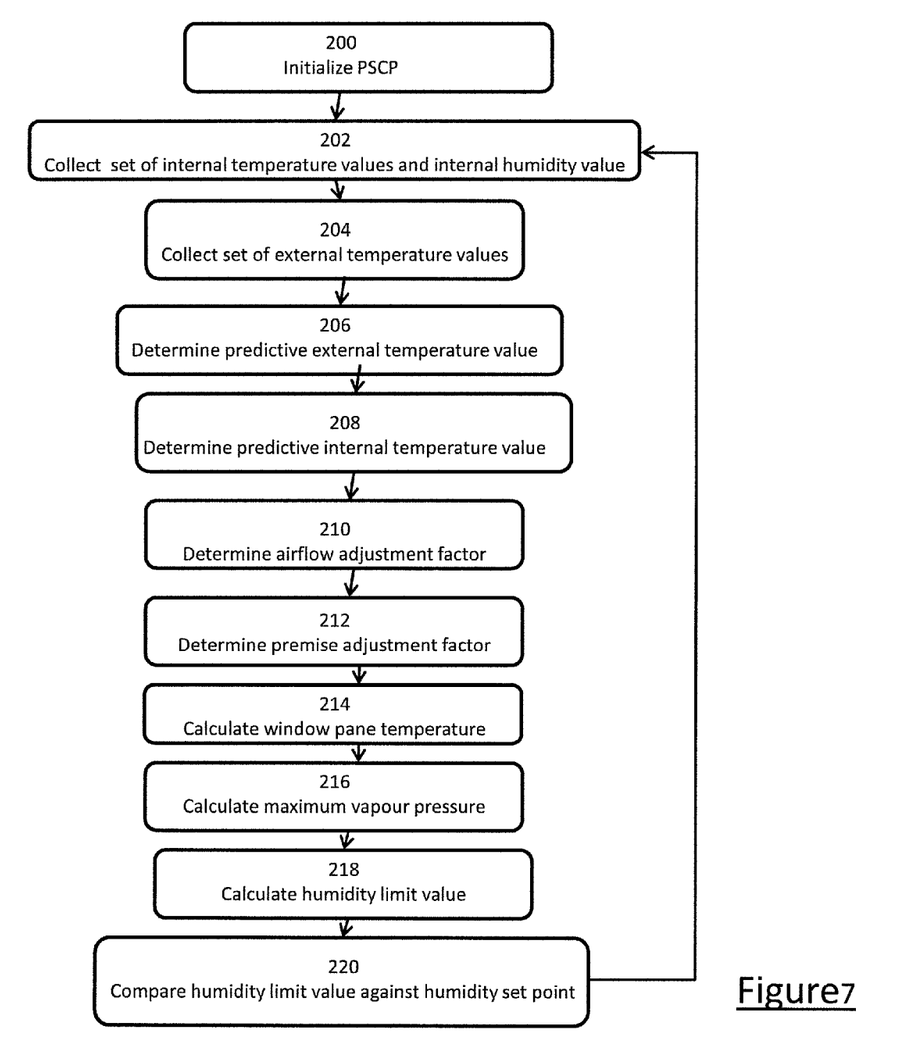
FIG. 7 is an illustration of a method for running a predictive scheduling control program (PSCP) on the controller shown in FIG. 1, the PSCP being operable to adjust a pre-programmed set point based upon predicted values.

For example, PSCP 122 is operable to adjust the humidity set point as to reduce or obviate condensation forming along external perimeter 14, and in particular window pane 18. Referring now to FIG. 7, a flowchart is shown illustrating one embodiment of PSCP 122. For ease of illustration, this embodiment of PSCP 122 does not include the use of any internal remote sensors 70. Beginning at step 200, PSCP 122 is initialized. In the currently-illustrated embodiment, PSCP 122 is initiated by selecting a Predictive Humidity Control option in Configuration Program 104 (not illustrated). Once activated, PSCP 122 will run continuously until later deactivated by a user. Alternatively, PSCP 122 may run for a limited period of time, or may be enabled by default, without intervention by a user. Once initialized, PSCP 122 advances to step 202.

At step 202, PSCP 122 collects a set of internal temperature values 124 (in degrees Celsius or Fahrenheit), as well as an internal humidity value 125 (relative humidity %). The set of internal temperature values 124 includes the corrected indoor temperature value 166 measured value for the temperature within premise 12, as determined from the environmental sensor 54 and modified by DTCP 150. The set of internal temperature values 124 may further include one or more future temperature values 126 for premise 12 (i.e., a future set point for premise 12), as determined by ECP 96 (and specifically scheduling program 106). The forecasted period for the future temperature values can be relatively short (for example, an hour), but other forecasted periods could also be used. Internal humidity value 125 is determined from the environmental sensor 54 within controller 22, and as such, represent the current-measured values for the humidity within premise 12. Once step 202 is completed, the method advances to step 204.

At step 204, PSCP 122 collects a set of external temperature values 128 (in degrees Celsius or Fahrenheit). In the currently-illustrated embodiment, the set of external temperate values 128 includes: a current outdoor temperature 130, at least one future outdoor temperature 132, and at least one historical temperature value 134. As illustrated, current outdoor temperature 130 is provided in the weather feed provided by the environmental web service 26. The at least one future outdoor temperature 132 is one or more forecasted outdoor temperature values provided by weather feed of environmental web service 26. The forecasted period can be relatively short (for example, one day), but other forecasted periods could also be used. The at least one historical temperature value 134 is one or more previously measured values of current outdoor temperature 130 that is stored in a historical record. In the presently-illustrated embodiment, controller 22 maintains an historical record of previously measured current outdoor temperatures 130 (stored either locally in memory 46, or retrieved across network 28 from environmental web service 26). In the currently-illustrated embodiment, the interval of historical record is hourly, and the historical record extends back four days. These historical records can be derived as average values across an entire hour, or measurements on the hour. Of course, other recording intervals and historical lengths for historical records could also be used. If a current outdoor temperature 130 is not presently available (for example, if communication on network 28 is down), controller 22 could instead use either the most recent historical temperature value 134, or if that is not available (for example, upon initialization of controller 22), using a default value until a new value becomes available. Once step 204 is completed, the method advances to step 206.

At step 206, PSCP 122 determines a predictive external temperature value 136 (in degrees Celsius or Fahrenheit). In the currently-illustrated embodiment, predictive external temperature value 136 is determined as the lowest external temperature value in the set of: the current outdoor temperature 130, the at least one future outdoor temperature 132 and the at least one historical temperature values 134. Of course, other permutations of the values used for predictive external temperature value 136 could also be used. For example, the predictive external temperature value 136 could be the lowest in the set of the at least one future outdoor temperature 132 and the at least one historical temperature value 134. Alternatively, the predictive external temperature value 136 could be determined as the lowest value in the set of: the current outdoor temperature 130, and the at least one historical temperature values 134 or the lowest in the set of the current outdoor temperature 130 and the at least one future temperature value 132. Once step 206 is completed, the method advances to step 208.

At step 208, PSCP 122 determines a predictive internal temperature value 138. In the currently-illustrated embodiment, the predictive internal temperature value 138 is determined as the lowest value in the set of: the current corrected indoor temperature 166 and the at least one future temperature value (as determined by scheduling program 106). Other permutations of the values used for the predictive internal temperature value 138 include using just the current corrected indoor temperature value 166 or the at least one future temperature value. Once step 208 is completed, the method advances to step 210.

At step 210, PSCP 122 determines an airflow adjustment factor 140, representing forced convection caused by wind and other airflow) (and measured in units of W/(m^2C)). Airflow adjustment factor 140 include two separate values, an convection coefficient $142_{inside}$ which represents generalized airflow within premise 12, and an convection coefficient $142_{outside}$ which represents generalized air flow outside of premise 12. Convection coefficient $142_{inside}$ can be determined by an airflow sensor located within controller 22 (if provided), or it can be an arbitrary value. It is contemplated that convection coefficient $142_{inside}$ could be estimated based upon fan runtime (if HVAC equipment 30 includes a fan), or a ventilator setting (if HVAC equipment 30 includes a ventilator). Alternatively, convection coefficient $142_{inside}$ can be an estimated value based upon the number of inhabitants of premise 12, as entered into Settings program 104, or through a baseline value provided by a web portal hosted by environmental web service 26, or through a combination of the aforementioned techniques. Convection coefficient $142_{outside}$ is provided by the external weather feed provided by environmental web service 26. Once step 210 is completed, the method advances to step 212.

At step 212, PSCP 122 determines a premise adjustment factor 144. In the currently-illustrated embodiment, premise adjustment factor 144 provides a numeric adjustment based upon the construction and materials used by premise 12. For example, premise adjustment factor 144 can include a factor based upon the construction material and design of window panes 16 (single or double-paned, casement or sliding, etc.). As discussed previously, users can input details relating to the construction of premise 12 into configuration program 104, or through a web portal hosted by environmental web service 26. Alternatively, controller 22 may be able to estimate the premise adjustment factor 144 based upon recorded historical data. For example, controller 22 could calculate the premise adjustment factor 144 based upon the external temperature (as provided through the weather feed provided by environmental web service 26) and the rate of temperature change within premise 12 when the furnace or air conditioner of HVAC equipment 30 is turned off. Alternatively, the energy modelling server 86 could calculate the premise adjustment factor 144, or provide an estimate based upon similar profiles stored in aggregate data servers 84. Once step 212 is completed, the method advances to step 214.

At step 214, PSCP 122 calculates the window pane temperature 146 for the interior and exterior sides of window pane 18 using the predictive external temperature value 136 and the predictive indoor temperatures 134. Alternatively, a single window pane temperature 146 (i.e., not distinguishing between inside and outside values) could be calculated. The method of calculating window pane temperature $146_{inside}$ and window pane temperature $146_{outside}$ is not particularly limited, and is well known to those of skill in the art. In the present embodiment, window pane temperature $70_{outside}$ is calculated as a function of the predictive external temperature value 136 and the predictive internal temperature value 138, modified by the premise adjustment factor 144 and the airflow adjustment factor 140. For ease of illustration, a single value for window pane temperature 146 could be determined as: the predictive internal temperature value 138−airflow adjustment factor*premise adjustment factor 144*(predictive internal temperature value 138-predictive external temperature value 136). Other functions for calculating window pane temperature 136 could also be used. Once step 214 is completed, the method advances to step 216.

At step 216, PSCP 122 calculates the maximum vapour pressure $147_{premise}$ and maximum vapour pressure $147_{window}$, which represent the maximum vapour pressure before condensation begins, calculated for within premise 12 and on the inside of window pane 18, respectively using the predictive indoor temperature 134. Once step 2162 is completed, the method advances to step 218.

At step 218, PSCP 122 calculates the humidity limit value 148 that can be permitted for premise 12. In the presently-illustrated embodiment, the humidity limit value 148 is calculated as maximum vapour pressure $147_{premise}$ divided by maximum vapour pressure $147_{window}$ multiplied by 100. Once step 218 is completed, the method advances to step 220.

At step 220, PSCP 122 compares the humidity limit value 148 determined in step 212 against the humidity set point provided by ECP 96 (and determined by the user). If the humidity limit value 148 is less than the use-defined humidity set point, then ECP 96 will use the humidity limit value 148 as the effective humidity set point used in determining calls for humidification or dehumidification by HVAC equipment 30. It is contemplated that both the humidity limit value 148 and the humidity set point in ECP 96 will be limited by minimum and maximum values to ensure human comfort and minimize the possibilities of mould. In the current embodiment, the humidity limit value 148 and the humidity set point are limited to a minimum humidity vale and a maximum humidity value (for example, a minimum of 15% and a maximum of 50%, although other values could also be used). Once step 2182 is completed, the method returns to step 202.

Figure 8:
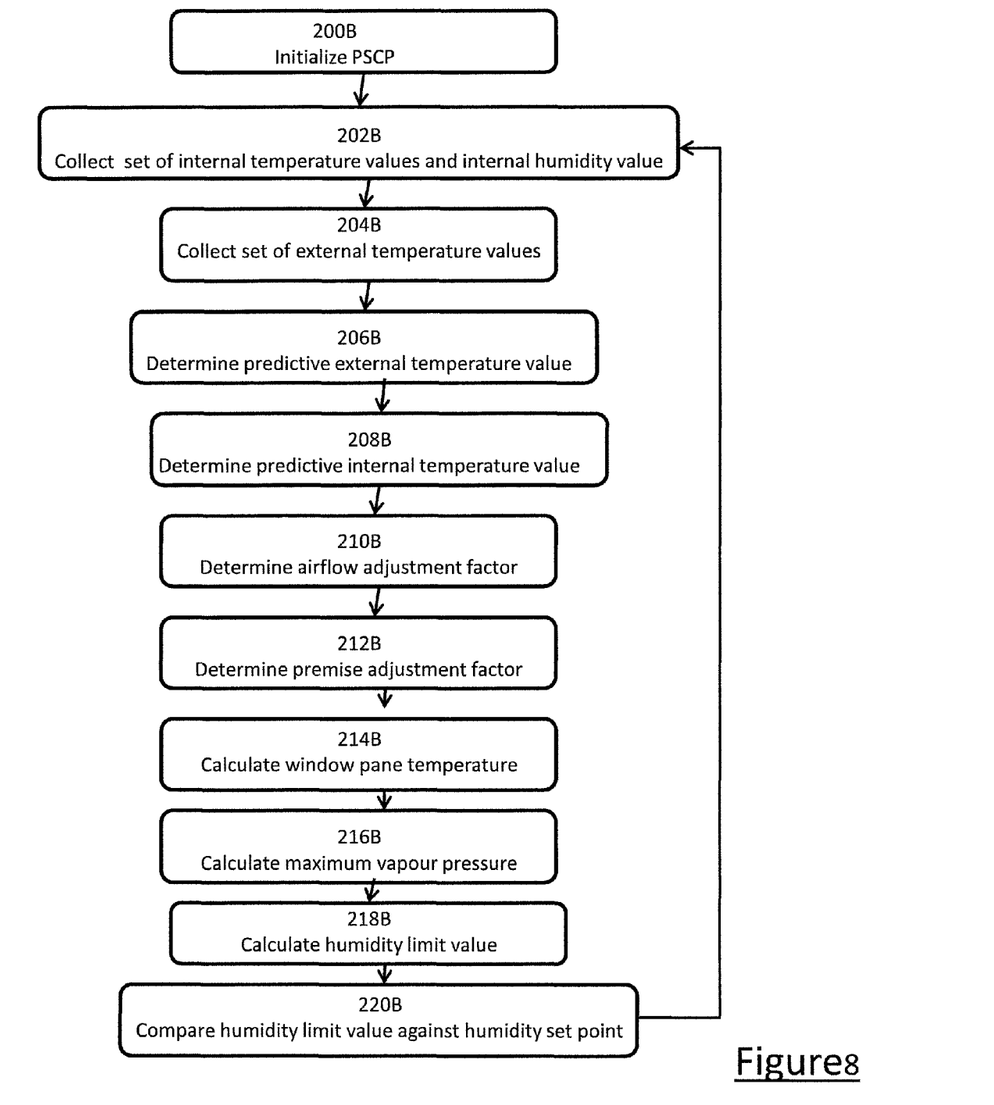
FIG. 8 is an illustration of another method for running a predictive scheduling control program (PSCP) on the controller shown in FIG. 1.

Referring now to FIG. 8, a flowchart is shown illustrating another embodiment of PSCP 122B, which uses both internal and external remote sensors 70, beginning at step 200B. Method 200B is substantially identical to method 200, except as described below.

At step 202B, PSCP122B collects a set of internal temperature values 124B (in degrees Celsius or Fahrenheit), as well as an internal humidity value 125B (relative humidity %). The set of internal temperature values 124B includes the corrected indoor temperature value 166 (as determined from the environmental sensor 54 and modified by DTCP 150) averaged with the measurements from remote sensors $70_{inside}$.

At step 204B, PSCP 122 collects a set of external temperature values 128B (in degrees Celsius or Fahrenheit). In the currently-illustrated embodiment, the set of external temperate values 128B includes: a current outdoor temperature 130B, at least one future outdoor temperature 132B, and at least one historical temperature value 134B. As illustrated, current outdoor temperature 130B can be provided solely by a remote sensor $70_{outside}$ or provided by an average of a value generated by the remote sensor $70_{outside}$ and the weather feed provided by the environmental web service 26. The at least one future outdoor temperature 132B remains one or more forecasted outdoor temperature values provided by weather feed of environmental web service 26. The at least one historical temperature value 134B is one or more previously measured or calculated values of current outdoor temperature 130B At step 210B, PSCP 122 determines an airflow adjustment factor 140B, representing forced convection caused by wind and other airflow) (and measured in units of W/(m^2C)). Airflow adjustment factor 140B include two separate values, an convection coefficient $142B_{inside}$ which represents generalized airflow within premise 12, and an convection coefficient $142B_{outside}$ which represents generalized air flow outside of premise 12. Convection coefficient $142B_{inside}$ can be determined by an airflow sensor located within controller 22 (if provided), a value provided by an airflow sensor located in one or more remote sensors $70_{inside}$, an average of different airflow sensors located on premise 12 or it can be an arbitrary value. Convection coefficient $142_{outside}$ is provided by an airflow sensor located in one or more remote sensors $70_{outside}$, the external weather feed provided by environmental web service 26, or an average value derived from the remote sensors $70_{outside}$ and the external weather feed.

Figure 9:
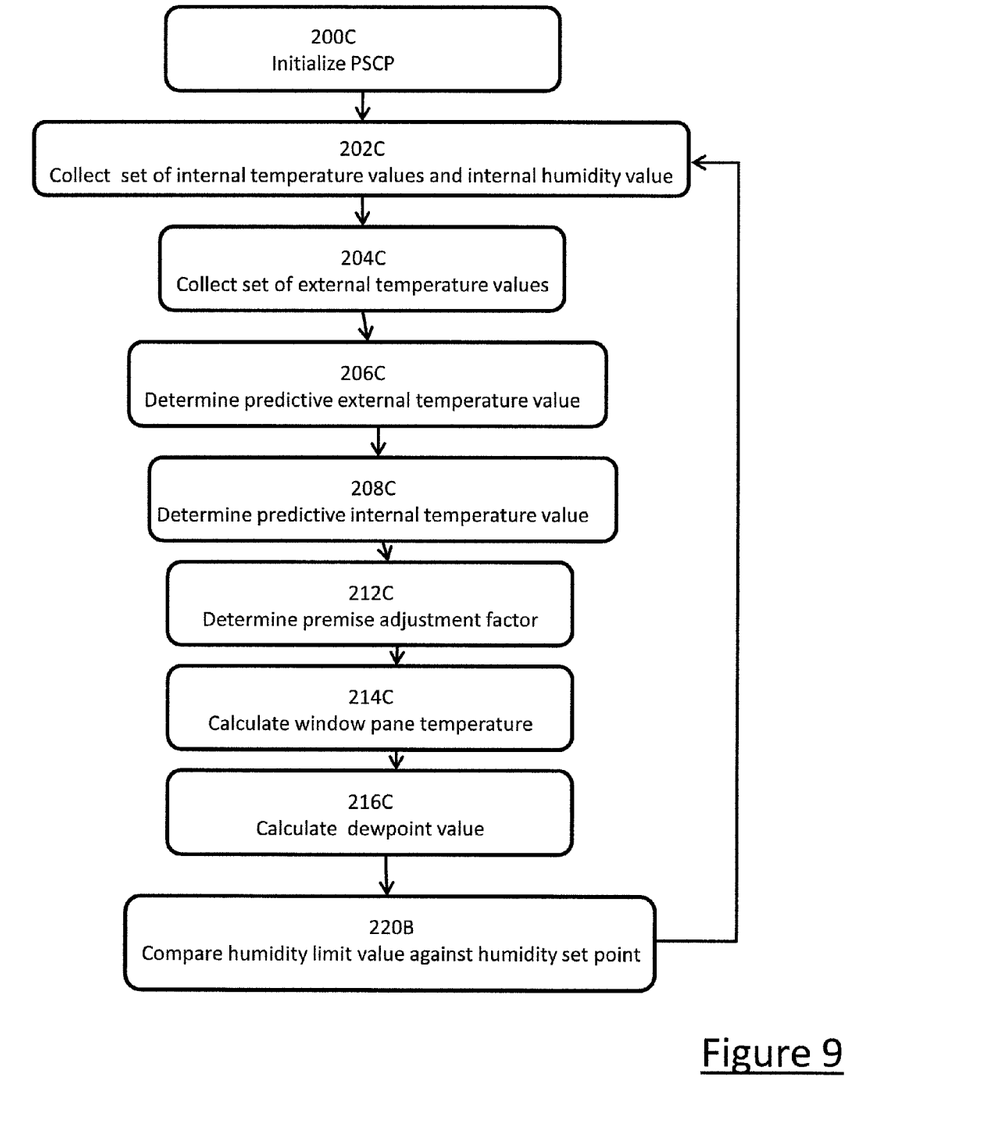
FIG. 9 is an illustration of another method for running a predictive scheduling control program (PSCP) on the controller shown in FIG. 1.

Referring now to FIG. 9, another embodiment of PSCP 122, namely PSCP 122C is shown. Unlike the previously described methods, PSCP 122C does not factor airflow into its calculation of a humidity limit value 176C. For ease of illustration, this embodiment of PSCP 122C does not describe the use of any internal remote sensors 70, but is not particularly limited as to exclude the use of remote sensors 70.

At step 202C, PSCP 122 collects a set of internal temperature values 124C (in degrees Celsius or Fahrenheit), as well as an internal humidity value 125C (relative humidity %), as is described above with reference to method 200.

At step 204, PSCP 122 collects a set of external temperature values 128C (in degrees Celsius or Fahrenheit), as is described above.

At step 206, PSCP 122 determines a predictive external temperature value 136C (in degrees Celsius or Fahrenheit), as is described above.

At step 208, PSCP 122 determines a predictive internal temperature value 138C, as is described above.

At step 212C, PSCP 122 determines a premise adjustment factor 144C as is described above.

At step 214C, PSCP 122 calculates the window pane temperature 146C for the interior of window pane 18, as is described above.

At step 216C, PSCP 122 calculates the dew point value 188 for window pane 18.

At step 220C, PSCP 122C compares the dewpoint value 188 against the window pane temperature $146C_{inside}$. If the dewpoint value 188 value is greater than or equal to the window pane temperature $146C_{inside}$, then ECP 96 will deactivate any humidification by HVAC equipment 30 nor be allowed to issue calls for humidity until the dewpoint value 188 is less than the window pane temperature $146C_{inside}$.

It is contemplated that the range forward for the at least one future temperature value 132 and the range backwards for the at least one historical temperature value 134 collected in step 204 of the methods described above can be shorted or lengthened depending on the effectiveness of the humidification/dehumidification provided by HVAC equipment 30, with more responsive HVAC equipment 30 using shorter ranges and less responsive HVAC equipment 30 using longer ranges. For example, steam humidifiers can rapidly humidify a premise 30 relative to evaporative humidifiers (which only operate during a heating cycle of HVAC equipment 30). It is contemplated that PSCP 122 could calculate or determine a humidification rate of change value (HROC) 180, measured in humidification percentage change per hour. The value for HROC 180 could be a predetermined value (based upon an equipment specification for the HVAC equipment 30), could be a calculated value (based upon historical humidity and furnace runtime measurements stored in non-volatile memory 70), or could be an arbitrary estimate. Using HROC 180, PSCP 122 could determine a dynamically calculated range window 182 so that HVAC equipment 30 having higher HROC 180 values would use shorter ranges for their sets of external temperature values 128, and that that HVAC equipment 30 having lower HROC 180 values would use longer ranges for their sets of external temperature values 128. It is also contemplated that the range forward for the at least one future temperature value 132 and the range backwards for the at least one historical temperature value 134 can be shorted or lengthened depending on the rate of change for the external temperature so that greater rates of change would use longer ranges and smaller rates of change would use shorter ranges. It is further contemplated that PSCP 122 could extend or reduce the range forward for the at least one future temperature value 132 depending on the relative accuracy of the future predictions of the weather feed supplied by environmental web service 26 sured accuracy of For example, the HVAC equipment 30 within premise 12 has an HROC 180 of 0.5% per hour. The window panes 18 are relatively inefficient single pane windows having a poor R-value. The user-determined humidity set point within ECP 96 is 50%. The set of indoor temperature values is fixed at a continuous 22° C. The current outdoor temperature 130 is 0° C., the forecasted future outdoor temperature 132 for tomorrow is −5° C., and at least one historical temperature value 134 (over the past three days) is −20° C., −10° C., and −7° C. Using the method described above, PSCP 122 would calculate the humidity limit value 148 using the lowest value of −20° C., yielding a much lower humidity limit value 148 than the RH level where condensation would actually occur (for example, 29% RH instead of 50%). Looking at the set of external temperature values 128, PSCP 122 could determine that the maximum daily temperature delta is 10° C.

Although an HVAC Controller with Predictive Set-Point Control/Dynamic Temperature Correction as been used to establish a context for disclosure herein, it is contemplated as having wider applicability. Furthermore, the disclosure herein has been described with reference to specific embodiments; however, varying modifications thereof will be apparent to those skilled in the art without departing from the scope of the invention as defined by the appended claims.

List of Elements

Premise 12
External perimeter 14
Walls 16
Window panes 18
ICCS 20
Controller 22
Remote device 24
Environmental web service 26
Network 28
HVAC equipment 30
EIM 32
Housing 34
Input 36
Output 38
Touch screen display 40
Hard key 42
Processor 44
Memory 46
RF subsystem 48
I/O interface 50
Power source 52
Current sensor 53
Environmental sensor 54
Applications 56
Volatile memory storage 58
Non-volatile memory storage 60
Wi-Fi chip 62
Wi-Fi antenna 64
Expansion slot/socket 66
Audio subsystem 68
Reset switch 69
Remote sensor 70 (remote sensor $70_{inside}$ and remote sensor $70_{outside}$)
Personal computer 72
Mobile device 74
Cellular network 76
Customer account data 80
Aggregate data warehouse 84
Energy modeling server 86
environmental control program (ECP) 96
ECP details 96a
a weather program 98
an energy use program 100
a remote sensors program 102
configuration program 104
scheduling program 106
vacation override program 108
quick save override program 110
temperature slider 112
time periods 114
editor 116
wizard 118
remote sensor program 102
reporting application 120
PSCP 122, 122B, 122C
Set of internal temperature values 12, 124B, 124C
Internal humidity value 125, 125B, 125C
Future temperature values 126
Set of external temperature values 128, 128B, 128C
Current outdoor temperature 130, 130B
At least one future outdoor temperature 132, 132B
At least one historical temperature value 134, 134B, 136C
Predictive external temperature value 136
Predictive internal temperature value 138, 138C
Airflow adjustment factor 140, 140B
Convection coefficient $142_{inside}$, $142_{outside}$, $142B_{inside\ and\ outside}$
Premise adjustment factor 144, 144C
Window pane temperature 146 ($146_{inside}$, $146_{outside}$), 146C
maximum vapour pressure 147

-continued

List of Elements humidity limit value 148
DTCP 150, 150B
Dynamic correction factor 152, 152B
Measured temperature value 154, $154B_{es}$, $154_{RS}$
Measured current flow 156
Instantaneous power consumption value 158
Effective power consumption value 160
Temperature offset table 162
Heat offset value 164
Airflow correction value 165
Corrected indoor temperature value 166, $166B_{ES}$
Average indoor temperature value 168B
Dewpoint value 188
Humidification rate of change value (HROC) 180
Step 200, step 202, 204, 206, 208, 210, 212, 214, 216, 218, 220
Step 200B, step 202B, 204B, 206B, 208B, 210B, 212B, 214B, 216B, 218B, 220B
Step 200C, step 202C, 204C, 206, 208, 210, 212, 214, 216, 218, 220
Step 300, 302, 304, 306, 308, 310, 312
Step 300B, 302B, 304B, 306B, 308B, 310B, 312B, 314B

What is claimed is:

1. A controller for operating HVAC equipment on a premise, the controller having:
a processor operable to run an environmental control program, the environmental control program being operable to control the HVAC equipment;
volatile and non-volatile memory; and
an environmental sensor operable to provide a measured temperature value to the environmental control program for use in operating the HVAC equipment; and
wherein the processor is further operable to run a dynamic temperature control program that is operable to provide a dynamic correction factor to the environmental control program that dynamically compensates the measured temperature value relative to a premise temperature to create a corrected indoor temperature value, the dynamic correction factor being a function of a power consumption value determined by the controller.

2. The controller of claim 1, wherein the controller includes a current sensor and the power consumption value within the controller is determined based upon a measured current flow within the controller.

3. The controller of claim 1, wherein the controller includes an airflow sensor and the dynamic correction factor includes an airflow coefficient representing airflow within the controller.

4. The controller of claim 1, wherein the dynamic correction factor is determined by referencing the power consumption value in a heat offset table to return a heat offset value, the heat offset value being used to determine the dynamic correction factor.

5. The controller of claim 1, wherein the dynamic correction factor is applied in an increasing amount for a period of time until 100% of the dynamic correction factor is applied to the measured temperature value upon initialization of the controller.

6. The controller of claim 1, wherein the controller is operable to communicate with an environmental web service across a network, and the dynamic correction factor is determined by referencing the power consumption value in a heat offset table to return a heat offset value, the heat offset value being used to determine the dynamic correction factor, and where the heat offset table is updatable across the network.

7. The controller of claim 1, wherein the power consumption value within the controller is determined based upon discrete levels of operation of subcomponents of the controller.

8. The controller of claim 1, wherein the power consumption value within the controller is determined based upon discrete levels of operation of subcomponents of the controller, the subcomponents including at least one of a display, a RF subassembly and the processor.

9. The controller of claim 1, wherein the dynamic correction factor is applied to a measured temperature provided by an environmental sensor located within the controller, and then averaged with at least one other measured temperature provided by at least one remote sensor.

10. A method for measuring temperature in a controller on a premise, the controller having an internal environmental sensor, the method comprising:
receiving a measured temperature value from the environmental sensor;
applying a dynamic correction factor to the measured temperature value to determine a corrected indoor temperature value which compensates for waste heat within the controller; and
providing the corrected indoor temperature value to an environmental control program running on the controller, the environmental control program being operable to control HVAC equipment on the premise; and
wherein the dynamic correction factor is determined by calculating a power consumption value within the controller, the dynamic correction factor being a function of the power consumption value within the controller.

11. The method of claim 10, wherein the power consumption value within the controller is determined based upon a measured current flow within the controller.

12. The method of claim 10, wherein the dynamic correction factor includes an airflow coefficient representing airflow within the controller.

13. The method of claim 10, wherein the dynamic correction factor is determined by referencing the power consumption value in a heat offset table to return a heat offset value, the heat offset value being used to determine the dynamic correction factor.

14. The method of claim 10, wherein the dynamic correction factor is applied in an increasing amount for a period of time until 100% of the dynamic correction factor is applied to the measured temperature value upon initialization of the controller to create the corrected indoor temperature value.

15. The method of claim 10, wherein the dynamic correction factor is determined by referencing the power consumption value in a heat offset table to return a heat offset value, the heat offset value being used to determine the dynamic correction factor, and where the heat offset table is updatable across a network.

16. The method of claim 10, wherein the power consumption value within the controller is determined based upon discrete levels of operation of subcomponents of the controller.

17. The method of claim 10, wherein the power consumption value within the controller is determined based upon discrete levels of operation of subcomponents of the controller, the subcomponents including at least one of a display, a RF subassembly and a processor.

18. The method of claim 10, wherein the dynamic correction factor is applied to a measured temperature provided by an environmental sensor located within the controller, and then averaged with at least one other measured temperature provided by at least one remote sensor to provide the corrected indoor temperature.

19. A dynamic control program for compensating for waste heat measured in a controller, the dynamic control program being stored in a non-volatile memory storage on the controller and operable to run on a processor of the controller located on a premise, the controller having an internal environmental sensor, comprising:
the program receiving a measured temperature value from the environmental sensor;
the program applying a dynamic correction factor to the measured temperature value to determine a corrected indoor temperature value which compensates for waste heat within the controller; and
the program providing the corrected indoor temperature value to an environmental control program running on the controller, the environmental control program being operable to control HVAC equipment on the premise; and
wherein the dynamic correction factor is determined by calculating a power consumption value within the controller, the dynamic correction factor being a function of the power consumption value within the controller.

20. The program of claim 19, wherein the power consumption value within the controller is determined based upon a measured current flow within the controller.

* * * * *